Sept. 1, 1925.
T. B. McLEROTH
1,551,999
METHOD OF BUILDING UP AIR TUBES FOR PNEUMATIC TIRES
Filed May 1, 1924     2 Sheets-Sheet 2
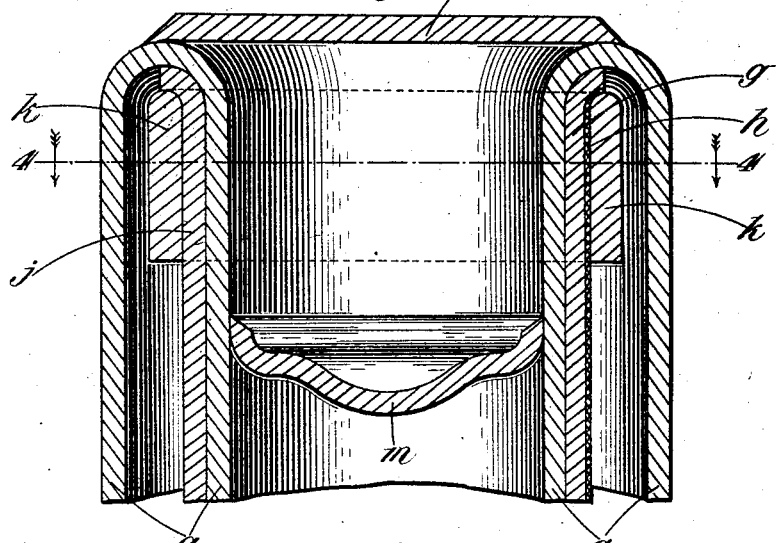
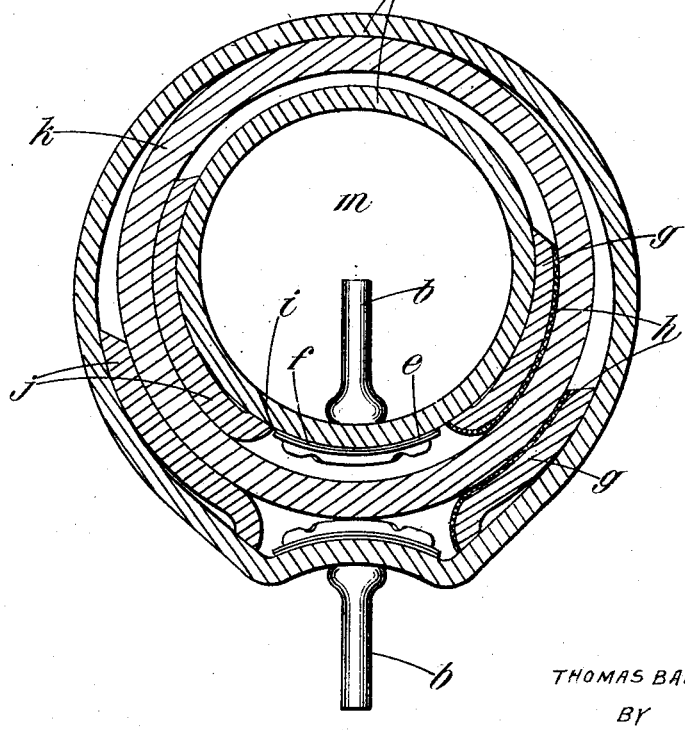
INVENTOR
THOMAS BAKER McLEROTH
BY
ATTORNEYS Patented Sept. 1, 1925.

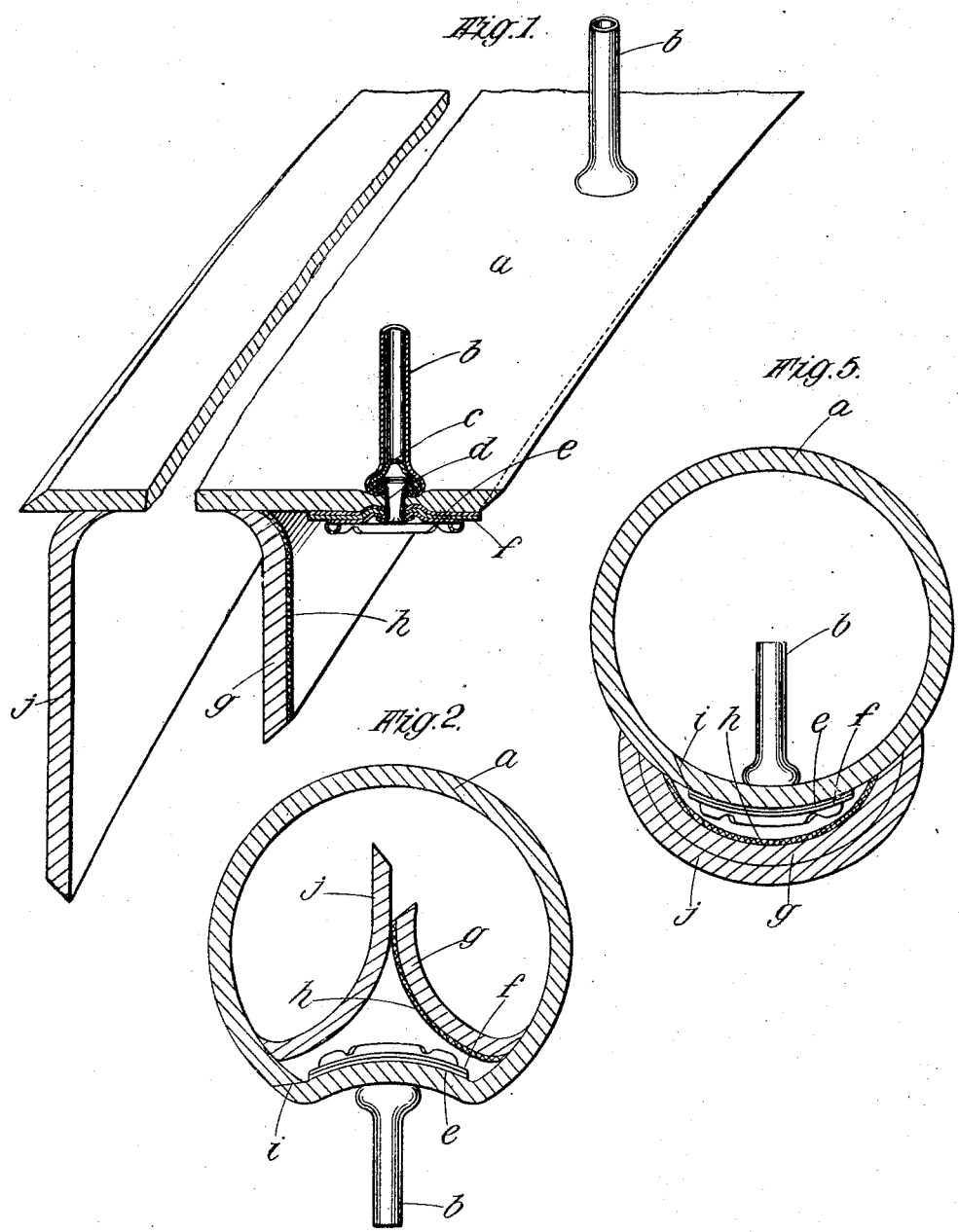

1,551,999

UNITED STATES PATENT OFFICE.

THOMAS BAKER McLEROTH, OF LONDON, ENGLAND, ASSIGNOR TO T. B. McLEROTH (TUBES) LIMITED, OF LONDON, ENGLAND, A BRITISH COMPANY.

METHOD OF BUILDING UP AIR TUBES FOR PNEUMATIC TIRES.

Application filed May 1, 1924. Serial No. 710,210.

*To all whom it may concern:*

Be it known that I, THOMAS BAKER MC-LEROTH, of 6 Lincoln's Inn Fields, London, W. C. 2, England, railway engineer, have invented certain new and useful Improvements in Methods of Building Up Air Tubes for Pneumatic Tires, of which the following is a specification.

In the specification of my application for Letters Patent Serial No. 623,393, filed 7th March, 1923, is described and claimed a method of producing a multi-cellular air tube into each of the cells of which projects a valveless feed tube communicating with a common feed or inflating passage constituted by a tubular strip or patch running around the inner periphery of the tube. According to said method the tube proper and the tubular strip or patch, after being built up as separate integers, the tube proper of raw rubber, the tubular strip or patch also of raw rubber, and the valveless feed tubes on the latter of partially-vulcanized rubber, are united by solution or otherwise and vulcanized simultaneously as a single unit without the use of solid cores during that process.

The present invention constitutes a modification of or improvement on that method and consists in securing the valveless rubber feed tubes to the raw rubber from which the tube proper is built up, instead of to a tubular strip or patch, and in applying to the raw rubber from which the tube proper is built up a strip or strips of raw rubber to build up the common feed passage.

A further modification consists in building up the tube proper from a strip of raw rubber by uniting the lateral margins of said strip so that the valveless feed tubes project outwardly, (i. e. building up the tube inside out), inserting into one end of such tube a ring, introverting said end of the tube, solutioning or otherwise securing to said tube, where it bends over said ring, a disc of raw rubber, further introverting said tube and securing another disc of raw rubber, and so on in succession.

Preferably the additional strip or strips of raw rubber, for the formation of the common feed passage, is or are applied before such introversion and the ends of the length of tube are joined up to form an annulus after such introversion, after which an additional layer or layers of raw rubber may be applied to the inner periphery of the tube and the latter may then be vulcanized.

The accompanying drawings serve to illustrate how the method, in accordance with one form of this invention, may be carried out. In the accompanying drawings Figure 1 is a fragmentary perspective view of the strip of raw rubber from which the tube proper is built up, shewing the feed tubes of partially vulcanized rubber in position thereon and also strips of raw rubber for forming the common feed passage; Figure 2 is a cross section of the tube after the edges of the strips have been joined and before the tube is introverted; Figure 3 is a sectional elevation illustrating the introversion of the tube; Figure 4 is a cross-section on the line 4—4, Figure 3; and Figure 5 is a cross-section of the tube after introversion and after formation of the common feed passage.

A strip of raw rubber *a*, of not less than the circumferential length of the tube to be produced and of a width corresponding with the cross section of said tube, has mounted along a line near one lateral margin a series of partially vulcanized feed tubes *b* . . . with so-called studs *c* . . . (such, for instance, as described and claimed in the specification of my prior Letters Patent No. 1,470,239), the necks *d* of said studs passing through not only the raw rubber *a* and the fabric washers *e* as in said prior invention but also through a strip *f* of stockinet running along the strip of raw rubber *a* and of a width corresponding with that of the common feed passage to be produced. A strip of raw rubber *g* with a similar strip of stockinet fabric *h* secured along its length is then secured to the strip *a* on the side remote from the feed tubes *b* . . . along a line parallel with the row of feed tubes and nearer the centre of width of the strip *a*. The edges of the strip *g* are bevelled and said strip is secured to the strip *a* by solutioning one of said edges and pressing it on to the strip *a* by means of a roller. The strips *g* and *h* are to form part of the common feed passage and to this end are of such width that their free edge extends beyond the corresponding edge of the strip *a*. Near the opposite edge of the strip *a* is similarly secured a strip of raw rubber *j* like, but slightly wider than, the strip *g* and without any stockinet fabric thereon. The edges of the strip *a* are then scafed and lap jointed, as at $i$ (or they may be butt jointed), said strip being so folded round in making the tube that the valveless rubber feed tubes $b$ ... project outwardly from the tube so made, that is to say the tube is made inside out, as shown in Figure 2.

A steel ring $k$ is slipped into one end of this tube, (after the strips $g$ and $j$ have been folded back as shown in Figure 4), and said end is then introverted a distance corresponding with the pitch of the feed tubes $b$ ..., as shown in Figure 3. The fold of the tube where it bends over said ring $k$ is then suitably cleaned with naphtha or like solvent and a raw rubber disc $m$, the edges of which have been scafed and solutioned is pressed against the recurved end of the tube by means of a roller. The tube is then further introverted, the disc $m$ passing through the steel ring $k$, and the process of cleaning the tube and applying another disc $m$ is repeated, solid ammonia or like substance, and if desired, French chalk also, being introduced into the cell of the air tube thus produced. The tube is further introverted and the cycle of operations repeated until the required length of air tube has been produced. The ends of the tube are scafed and lap jointed, (or if required butt jointed), after which the common feed passage is formed by folding the combined strip $g$, $h$ over the bases of the studs $c$ ... and solutioning and pressing its free edge to the strip $a$, beyond the joint at $i$, so that said joint is enclosed by the common feed passage, and then folding over the strip $j$ and solutioning and, pressing its free edge to the strip $a$ and preferably also solutioning its inner face to the outer face of the strip $g$. A suitable aperture is cut in the outer wall $g$, $h$, $j$, of the common inflating passage, a valve (not shewn) is mounted in position by means of the usual patch and the tube is then slightly inflated, placed in an annular mould (such, for instance, as described and illustrated in the specification and drawings accompanying my application for Letters Patent Serial No. 623,392 filed 7th March 1923) and further inflated, thus causing the raw rubber at and towards the outer periphery of the mould to stretch and take up the shape of the mould. The vulcanization is then carried out in the usual manner.

If desired, instead of forming the common feed passage from the strips $g$, $h$, $j$, as above set forth, a single strip of raw rubber may be applied by its edges to the tube. Such a strip may be secured along its one edge before the strip $a$ has been formed into a tube, or along both its edges either before or after introversion of said tube. When the common feed passage is so formed an additional thickness or thicknesses of raw rubber may be solutioned or otherwise caused to adhere to the inner periphery of the tube, such additional rubber preferably being stretched as it is applied so as to tend to contract the inner periphery of the tube.

I claim:—

The improved method of building up an air tube for a pneumatic tire of the kind hereinbefore set forth, which consists in securing valveless partially-vulcanized rubber feed tubes to a strip of raw rubber, forming said strip into a tube by uniting the lateral margins of said strip so that the valveless feed tubes project outwardly, inserting a ring into one end of such tube, introverting said end of the tube, securing to said tube, where it bends over said ring, a disc of raw rubber, further introverting said tube and securing another disc of raw rubber, and so on in succession, said discs dividing said tube into a series of compartments and being secured thereto intermediately of the valveless feed tubes, cutting off a predetermined length of said tube, uniting its ends to form an annulus and vulcanizing said tube, substantially as set forth.

THOMAS BAKER McLEROTH.